United States Patent Office 3,030,326
Patented Apr. 17, 1962

3,030,326
PREPARING A GRAFT COPOLYMER OF VINYL ACETATE AND A PROPYLENE OXIDE, ETHYLENE OXIDE AND ETHYLENE DIAMINE REACTION PRODUCT AND COMPOSITIONS CONTAINING SAME
Albert I. Goldberg, Berkeley Heights, and Arnold B. Loebel and K Victor Jasinski, now by change of name, Victor Jasinski, Plainfield, N.J., assignors to National Starch and Chemical Corporation, New York, N.Y., a corporation of Delaware
No Drawing. Filed June 10, 1959, Ser. No. 819,246
9 Claims. (Cl. 260—296)

This invention relates to the preparation of graft copolymers by the copolymerization of polyethers with vinyl acetate, and to the products thus obtained. It is the primary object of this invention to prepare non-ionic, emulsifier-free graft copolymers which possess a number of substantially improved properties, including excellent stability to heat, light, mechanical agitation and repeated freeze-thaw cycles. An additional object of this invention is the use of these graft copolymers in the preparation of films, and particularly paints, which are characterized by notable gloss, water resistance, toughness and flexibility.

The preparation of vinyl acetate copolymers is a process well known in the art. Structurally, these copolymers may be represented by the following formula:

—V—V—V—E—V—V—E—V—E—V—V—V— where "V" represents a vinyl acetate monomer and "E" represents the comonomer. Such copolymers, which are always prepared from two unsaturated monomers, are obviously random in their structure and their properties are generally intermediate between those of polyvinyl acetate and the polymer derived from the homopolymerization of the comonomer. A vinyl acetate graft copolymer, on the other hand, is made by polymerizing monomeric vinyl acetate in the presence of a previously prepared polymer of some other species. The resulting graft copolymers have a structure which may be represented by the following formula:

```
—EEEEEEEEEEEEEEEEEEE—
   |  |  |    |
   V  V  V    V
   V  V  V    V
   V  V  V    V
   V     V    V
         V
``` wherein vinyl acetate (VVVVV—) is simultaneously polymerized and attached, or grafted, in the form of side chains of polyvinyl acetate, on to the polymeric backbone (—EEEEEEEEE—) which, in the case of the products of our invention, would be a polyether of the type described below. In addition to differing structurally from ordinary vinyl acetate copolymers, such grafts also have considerably different properties, which offer many new uses to the practitioner.

We have discovered that novel graft copolymers displaying surprisingly improved properties may be prepared by the copolymerization of specified polyethers with vinyl acetate, or with mixtures of the latter and other polymerizable monomers.

The polyethers which we may use in the process of our invention are the polyether block copolymers resulting from the sequential addition of propylene and ethylene oxides to ethylene diamine. The structure of these products may be represented as follows:

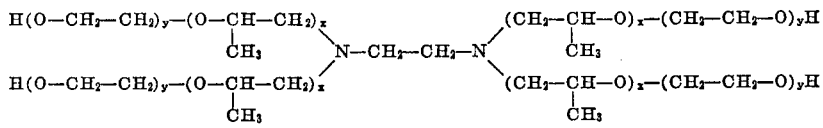

wherein "x" may have a value of from 10 to 20 and "y" a value of from 50 to 140.

These copolymers may be prepared with varying proportions of polyoxyethylene and polyoxypropylene units and with varying molecular weights. They are available from Wyandotte Chemicals Corp. under the trade name Tetronic, and, for the sake of brevity, they will hereinafter be referred to by this name.

In particular, we prefer to employ a Tetronic sold under the specific trade name Tetronic 908. This polyether has values for "x" and "y," as used in the above described structural formula, of 20 and 140 respectively; the polyoxypropylene-ethylene diamine portion of its molecule has an average molecular weight of 3,600–4,500; its polyoxypropylene:polyoxyethylene ratio is 1:4; and, its total average molecular weight is 27,000.

The Tetronics are described as block copolymers, since the basic composition of their polymeric chains may be represented by a symbolic structure such as:

—XXXX—YYYY—XXXX— wherein "X" and "Y" represent, respectively, units of the two monomeric species which are arranged in repeating groups, or blocks, e.g. —XXXX— or —YYYY—, which alternate with one another. This is in marked contrast to the earlier described random structure of ordinary copolymers.

Although Tetronics have previously been proposed as emulsifiers, the process of our invention is the first to prepare graft copolymers from monomeric vinyl acetate with these polyethers, wherein the latter are an integral part of the resulting graft copolymers. These grafts have a structure comparable to that already described, namely, wherein the polymeric backbone which provides the grafting sites for the short side chains of polyvinyl acetate, or copolymers thereof, is, in the case of our products, derived from a Tetronic polyether block copolymer.

In order to confirm the existence of the above described structure, we made use of two analytical techniques. The first involved alcoholysis of the final graft with sodium methoxide, followed by separation of the alcohol-soluble and insoluble fractions. The second procedure involved separation of the graft copolymer by means of fractional solution using mixtures of water and methanol. Both of these analytical methods proved, conclusively, that the total available quantity of polyether is completely utilized as the polymeric backbone of our graft copolymers.

In addition to the Tetronic block polyethers, we have also been able to employ another type of polyether component, namely polyethers of the structure:

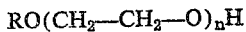

wherein $n$ may be any digit from 5–50 and preferably between 20 and 50; and where R may be either an aliphatic chain of from 7–20 and preferably from 12 to 18 carbon atoms, or, an alkaryl group wherein the alkyl moiety contains from 4–16 and preferably 8–9 carbon atoms as in octyl or nonyl phenyl. These materials have in the past been used chiefly as surface active agents; however, in the process of our invention they act for the first time as grafting sites, i.e. polymeric backbones, to which short side chains of polyvinyl acetate may be attached. In this respect they function analagously to the Tetronics and, in fact, they can only be used in combination with these block polyethers in the process of our invention.

It has already been mentioned that the polyethers may be polymerized with vinyl acetate or with mixtures of vinyl acetate and other polymerizable monomers. Such monomers copolymerizable with vinyl acetate may be selected, for example, from the alkyl acrylates, e.g. ethyl acrylate; alkyl methacrylates, e.g. methyl methacrylate; dialkyl maleates or fumarates, e.g. dibutyl maleate or fumarate; and vinyl halides, e.g. vinyl chloride. In all cases, these monomers may be used in monomeric mixtures with vinyl acetate provided that said mixtures contain at least 50%, by weight, of vinyl acetate, i.e. no more than 50%, by weight, of copolymerizable monomer may be present. In this specification it is to be understood that all references to vinyl acetate also refer to mixtures of the latter with any of the aforedescribed classes of copolymerizable monomers.

As for the proportions of vinyl acetate which may be reacted with the operable polyethers, we have found that with the Tetronics excellent results are obtained by graft polymerizing from 2–25%, by weight, of these polyethers with from 98–75% of vinyl acetate. Within this range, optimum properties are achieved by using from 3–7%, by weight, of polyether. This preferred range has generally been found to yield excellent film forming products which have a proper balance of emulsion stability and water resistance. The use of higher percentages of the block copolymer polyethers increases the water solubility of the resulting products, whereas the use of lesser quantities of these components will adversely affect the stability of the dispersion. The practitioner may thus produce our graft copolymers with increasing degrees of water solubility merely by increasing the concentration of Tetronic. However, as we have indicated, stable, water resistant, film forming products are best obtained with concentrations of from 3–7% of these components.

As for the alkyl or alkaryl polyethers, these can only, as stated, be used in combination with the Tetronic and may be present in concentrations ranging up to 15%, by weight, of the total amount of vinyl acetate present in the reaction system.

The graft copolymer products of our invention may be prepared by ether organic solution or aqueous dispersion polymerization techniques, of which many modifications are well known to the art. When prepared by solution polymerization, an oil soluble free radical type catalyst such as benzoyl peroxide is used and the polymerization is conducted in an organic solvent such, for example, as ethyl acetate, methylene chloride, benzene, toluene, methyl ethyl ketone, or acetone. If the final product is desired in the form of an aqueous dispersion, then at the completion of the polymerization water may be added, with agitation, and the solvent removed by distillation. A stable, fine particle size dispersion is obtained by this procedure.

For practical purposes, however, we have found it preferable to synthesize these graft copolymers directly in water, by means of aqueous dispersion polymerization techniques, the latter being distinguished from ordinary emulsion polymerization techniques by the absence therein of any free emulsifiers. These procedures involve the use of water soluble free radical type catalysts, preferably persulfate salts, which may be used with or without activators of the ferric or bisulfite variety. Other free radical catalysts, including peroxides and azo compounds, may also be employed. Although these aqueous dispersion polymerizations may be successfully run without the use of any additional surfactants or emulsifiers, their use is not precluded.

In any case, the resulting aqueous dispersion systems containing our polyvinyl acetate-polyether graft copolymers are found, in contrast to emulsions of ordinary random polyvinyl acetate copolymers, to be extremely stable to such diverse environmental factors as heat, light, mechanical agitation, and repeated freeze-thaw cycles. Furthermore, our dispersions are noteworthy for their uniform, fine particles size which ranges from 0.05–0.2 microns, and also for the fact that they may be prepared with an unusually high solids content, namely up to 60% by weight. All of these improved properties result mainly from the non-ionic character of our graft copolymer dispersions as well as from the absence of any added emulsifiers or protective colloids. Although emulsifier-free polyvinyl acetate latices are known, they have heretofore been prepared by means of random copolymerization with an ionic comonomer such as sodium acrylate or sodium vinyl sulfonate etc., in order to impart the desired stability.

Our graft copolymer dispersions are thus unique in that the stabilizing group is neither an ionic comonomer nor added free emulsifier, but is instead an integral nonionic component of the polymer molecule, which has been incorporated by means of graft rather than random copolymerization.

As has been indicated, the graft copolymers of our invention may be prepared in either water soluble or water resistant form. The water resistant type is particularly useful as a film forming material, from which films may be cast by any of the techniques known to the art. These films may be used as clear coatings or, upon formulation with the proper thickeners and pigments, etc., they may be employed as paints of either the "gloss" or "flat" variety. In any of these film forming applications the resulting films possess excellent gloss, toughness, water resistance and flexibility. Regarding this latter property, it has been found that the use of the Tetronics in our graft copolymers makes it possible to obtain films with a degree of flexibility which is unattainable by the mere formulation of any previously prepared vinyl acetate emulsion or lacquer with these same block polyethers. Furthermore, the unpigmented films derived from our graft copolymers are characterized by an exceptionally high degree of clarity.

The following examples will illustrate the embodiment of our invention in greater detail. In these examples all parts given are by weight, unless otherwise noted.

EXAMPLE I

This example illustrates the preparation of a graft copolymer derived from vinyl acetate, Tetronic 908, and nonyl phenoxy polyoxyethylene alcohol, by means of a direct aqueous dispersion polymerization technique which involved charging the ingredients into a suitable reactor and bringing them to reflux temperature. After 3 hours the reflux temperature rose to 94° C., and thus indicated the completion of the reaction.

For the resulting dispersion, as well as for all of the other graft polymers described in subsequent examples, we determined the percent by weight of solids; the pH; the average particle size in microns; and the viscosity in centipoises at 25° C. We also cast a number of 1.5 mil films from the dispersion and after air drying for one week at 20° C. the average surface hardness of these films was determined with a Sward hardness rocker, as sold by the Henery A. Gardner Laboratory Inc. of Bethesda, Md. This device measures surface hardness and, indirectly, flexibility (i.e., those materials which are soft are also generally flexible). The results of these hardness tests were rated on an arbitrary numerical scale of from 0 to 100. Thus, plate glass gives a value of 100, while a value of 0 implies a surface which is so soft as to be tacky. An intermediate value of about 48 is usually obtained for films cast from ordinary, random polyvinyl acetate emulsions, and may be useful in appraising the experimental results obtained with our graft copolymer latices.

*Data: Example I*

| | Parts |
|---|---|
| Vinyl acetate | 100.0 |
| Ammonium persulfate | 0.12 |
| $CH_3-(CH_2)_8-\langle\rangle-O-(CH_2CH_2O)_{30}H$ [1] | 5.0 |
| Tetronic 908 | 4.0 |
| Water | 88.0 |
| Percent solids | 55 |
| pH | 4.7 |
| Av. particle size | 0.16 |
| Viscosity (cps. @ 25° C.) | 800 |
| Sward rocker hardness | 26 |

[1] Nonyl phenoxy polyoxyethylene alcohol.

Films cast from this dispersion exhibited excellent clarity, gloss, water resistance and resistance to blocking. Extraction of the films with hot water showed that both the Tetronic and the nonyl phenoxy polyoxyethylene alcohol were completely bound (i.e. grafted) to the polyvinyl acetate.

EXAMPLE II

This example illustrates the preparation of a graft copolymer derived from vinyl acetate, methyl methacrylate, dodecyl polyoxyethylene alcohol, and Tetronic 908 by means of a direct aqueous dispersion polymerization technique as described in Example I, except that in this case 25% of the monomer mix was incorporated initially and the remaining 75% added over a two hour period.

*Data: Example II*

| | Parts |
|---|---|
| Vinyl acetate | 70.0 |
| Methyl methacrylate | 30.0 |
| Tetronic 908 | 3.0 |
| $CH_3-(CH_2)_{11}-O-(CH_2CH_2O)_{30}H$ [1] | 4.0 |
| Ammonium persulfate | 0.3 |
| Water | 120.0 |
| Percent solids | 47 |
| pH | 4.9 |
| Av. particle size | 0.15 |
| Viscosity (cps. @ 25° C.) | 250 |
| Sward rocker hardness | — |

[1] Dodecyl polyoxyethylene alcohol.

This dispersion did not form a continuous film upon drying at room temperatures which, of course, prevented the determination of a Sward hardness value. However, after baking for 15 minutes at 130° C. it yielded a tough, flexible film with a Sward hardness value of 30. When this dispersion was formulated into "gloss" paints by the incorporation of volatile film fusion agents, etc., the resulting paints displayed excellent toughness, durability, high gloss, hardness and notable water resistance.

EXAMPLE III

This example illustrates the preparation of a graft copolymer derived from vinyl acetate, octadecyl polyoxyethylene alcohol, and Tetronic 908 by means of a direct aqueous dispersion polymerization technique as described in Example II.

*Data: Example III*

| | Parts |
|---|---|
| Vinyl acetate | 100.0 |
| Tetronic 908 | 2.0 |
| $CH_3-(CH_2)_{17}-O-(CH_2CH_2O)_{40}H$ [1] | 10.0 |
| Ammonium persulfate | 0.12 |
| Water | 120.0 |
| Percent solids | 48.5 |
| pH | 3.1 |
| Av. particle size | 0.25 |
| Viscosity (cps. @ 25° C.) | 100 |
| Sward rocker hardness | 8 |

[1] Octadecyl polyoxyethylene alcohol.

This dispersion yielded films which were especially noteworthy for their excellent non-blocking characteristics.

EXAMPLE IV

This example illustrates the preparation of a graft copolymer from Tetronic 908, octyl phenoxy polyoxyethylene alcohol, and a monomeric mixture of vinyl acetate and vinyl chloride.

The procedure for the polymerization of this product differed from the procedure described in the preparation of the preceding examples. In particular, this technique involved the introduction of the gaseous vinyl chloride monomer together with the other components into an autoclave equipped with means for mechanical agitation. The reaction was run, under agitation, for 16 hours at a temperature of 55° C. and had an initial pressure of 60 p.s.i. The completion of the reaction was indicated by a drop in the pressure to 0 p.s.i.

*Data: Example IV*

| | Parts |
|---|---|
| Vinyl acetate | 51.0 |
| Vinyl chloride | 49.0 |
| Tetronic 908 | 5.0 |
| $CH_3(CH_2)_7-\langle\rangle-O-(CH_2CH_2O)_{30}H$ [1] | 7.5 |
| Ammonium persulfate | 0.4 |
| Sodium acetate | 0.4 |
| Water | 118.0 |
| Percent solids | 48 |
| pH | 4.4 |
| Av. particle size | 0.08 |
| Viscosity (cps. @ 25° C.) | 500 |
| Sward rocker hardness | — |

[1] Octyl phenoxy polyoxyethylene alcohol.

This dispersion did not form a continuous film upon drying at room temperatures which, of course, prevented the determination of a Sward hardness value. However, after baking for 15 minutes at 130° C. it yielded a tough, flexible film with a Sward hardness value of 30. When this batch was formulated into "gloss" paints by the incorporation of volatile film fusion agents, etc., the resulting paints displayed excellent toughness, durability, high gloss, hardness and notable water resistance.

EXAMPLE V

This example illustrates the use of one of the graft co-

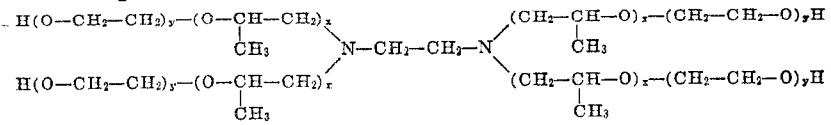

polymers of our invention as the resinous binder in the formulation of a "gloss" paint. In this particular formulation, we made use of the graft copolymer dispersion derived from Tetronic 908, dodecyl polyoxyethylene alcohol, and a monomeric mixture of vinyl acetate and methyl methacrylate whose preparation and properties were discussed in the description of Example II. The formula for the dodecyl polyoxyethylene alcohol is $$CH_3-(CH_2)_{11}-O-(CH_2CH_2O)_{30}H$$

In preparing this paint, the procedure followed involved the initial preparation, under agitation, of a pigment paste mixture comprising the following ingredients.

|  | Parts |
|---|---|
| Water | 50.0 |
| Potassium tripolyphosphate | 4.0 |
| Advawet #33 (a nonionic polyglycol ester wetting agent as sold by the Advance Solvents & Chemical Division of Carlisle Chemical Works, Inc., New Brunswick, N.J.) | 1.5 |
| Tamol 731 (an aqueous, 25% by weight, solution of a non-ionic surfactant comprising the sodium salt of a low molecular weight carboxylated polyelectrolyte as sold by the Rohm & Haas Co. of Philadelphia, Pa.) | 1.2 |
| A premix of: | |
| Acrysol G-110 (an aqueous solution of ammonium polyacrylate as sold by the Rohm & Haas Co.) | 25.0 |
| Water | 25.0 |
| Titanox RA-NC (a modified rutile titanium dioxide pigment as sold by the National Lead Co.) | 150.0 |
| Ethylene glycol | 30.0 |
| Foamicide 581-B (an oil-free nonionic defoamer as sold by Colloids Inc. of Newark, N.J.) | 1.0 |

The above described pigment paste mixture was then dispersed in a high speed paint mill and during this dispersion process an emulsion vehicle, as described below, was slowly added to it. This emulsion vehicle comprised the following ingredients.

|  | Parts |
|---|---|
| Graft copolymer dispersion of Example II | 630.0 |
| A premix of: | |
| Acrysol G-110 | 19.2 |
| Water | 26.0 |
| A premix of: | |
| Diethylene glycol monoethyl ether acetate | 48.4 |
| Water | 16.4 |

The resulting "gloss" paint provided excellent high gloss films which were exceedingly water resistant tough and flexible.

Summarizing, our invention provides for the preparation of novel graft copolymers characterized by a number of surprising and unique properties. They are particularly noteworthy for their non-ionic character, which is best observed in their exceedingly stable, emulsifier-free aqueous dispersions. Furthermore, the films derived from these products are outstanding in their clarity, gloss, toughness, flexibility and water resistance.

It is to be understood that variations and modifications may be made in materials, procedures, and proportions without departing from the spirit and scope of our invention, which is limited only by the following claims.

We claim:

1. A process for preparing a graft copolymer which comprises mixing vinyl acetate and a polyether having the structural formula

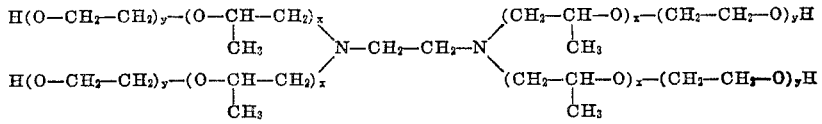

wherein $x$ has a value from 10 to 20 and $y$ has a value from 50 to 140, and heating said mixture in the presence of a free radical type polymerization catalyst, the amount of said vinyl acetate being from 98 to 75 parts by weight, and the amount of said polyether being from 2 to 25 parts by weight.

2. A process for preparing a graft copolymer which comprises mixing (A) vinyl acetate, (B) a monomer capable of copolymerizing with said vinyl acetate and selected from the group consisting of alkyl acrylates, alkyl methacrylates, alkyl maleates, alkyl fumarates and vinyl halides, and (C) the polyether of claim 1, and heating said mixture in the presence of a free radical type polymerization catalyst, the amount of (A) plus (B) being from 98 to 75 parts by weight, and the amount of (C) being from 2 to 25 parts by weight, and the amount of (A) being at least 50% by weight of (A) plus (B).

3. The process of claim 1 in which the vinyl acetate and the polyether are in aqueous dispersion.

4. The process of claim 1 in which the vinyl acetate is in solution in an organic solvent.

5. A graft copolymer obtained according to the process of claim 1.

6. An aqueous dispersion of a graft copolymer obtained accodring to the process of claim 3.

7. A solution of a graft copolymer obtained according to the process of claim 4.

8. A paint whose films are characterized by improved toughness, flexibility and scrub resistance, said paint containing as a resinous binder a graft copolymer obtained by heating in the presence of a free radical type polymerization catalyst a mixture of vinyl acetate and a polyether having the structural formula

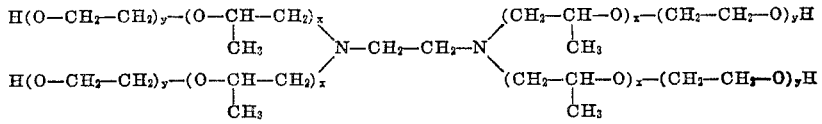

wherein $x$ has a value from 10 to 20 and $y$ has a value from 50 to 140, the amount of vinyl acetate in said mixture being from 98 to 75 parts by weight and the amount of polyether being from 2 to 25 parts by weight.

9. A gloss paint whose films are characterized by improved toughness, flexibility, scrub resistance and gloss, said paint containing as a resinous binder a graft copolymer resulting from heating in the presence of a free radical type polymerization catalyst a mixture of (A) vinyl acetate, (B) methyl methacrylate and (C) the polyether of claim 8, the amount of (A) plus (B) in said mixture being from 98 to 75 parts by weight, the amount of (C) being from 2 to 25 parts by weight, and the amount of (A) being at least 50% by weight of (A) plus (B).

References Cited in the file of this patent

UNITED STATES PATENTS

| 2,473,929 | Wilson | June 21, 1949 |
| 2,828,222 | Kine et al. | Mar. 25, 1958 |
| 2,828,223 | McWherter et al. | Mar. 25, 1958 |
| 2,840,447 | Green | June 24, 1958 |

Notice of Adverse Decision in Interference

In Interference No. 93,798 involving Patent No. 3,030,326, A. I. Goldberg, A.B. Loebel and K Victor Jasinski (now by change of name Victor Jasinski), PREPARING A GRAFT COPOLYMER OF VINYL ACETATE AND A PROPYLENE OXIDE, ETHYLENE OXIDE AND ETHYLENE DIAMINE REACTION PRODUCT AND COMPOSITIONS CONTAINING SAME, final judgment adverse to the patentees was rendered July 28, 1966, as to claim 4.

[*Official Gazette December 13, 1966.*]